(12) United States Patent
Subramanian et al.

(10) Patent No.: US 11,024,913 B2
(45) Date of Patent: Jun. 1, 2021

(54) BATTERY MODULE WITH TENSION MEMBER RESISTING DEFLECTION

(71) Applicant: Ford Global Technologies, LLC, Dearborn, MI (US)

(72) Inventors: Rajaram Subramanian, Ann Arbor, MI (US); Yongcai Wang, Ann Arbor, MI (US); Pax Daniel Maguire, Ann Arbor, MI (US); Bhaskara Boddakayala, Troy, MI (US); John Jardine, Harrison Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 475 days.

(21) Appl. No.: 15/884,765

(22) Filed: Jan. 31, 2018

(65) Prior Publication Data

US 2019/0237719 A1    Aug. 1, 2019

(51) Int. Cl.
| | | |
|---|---|---|
| *H01M 2/10* | (2006.01) | |
| *H01M 10/04* | (2006.01) | |
| *H01M 10/613* | (2014.01) | |
| *H01M 10/625* | (2014.01) | |
| *H01M 10/6556* | (2014.01) | |
| *H01M 10/6567* | (2014.01) | |
| *H01M 50/20* | (2021.01) | |
| *B60L 58/26* | (2019.01) | |

(52) U.S. Cl.
CPC ............. *H01M 50/20* (2021.01); *B60L 58/26* (2019.02); *H01M 10/0481* (2013.01); *H01M 10/613* (2015.04); *H01M 10/625* (2015.04); *H01M 10/6556* (2015.04); *H01M 10/6567* (2015.04); *H01M 2220/20* (2013.01)

(58) Field of Classification Search
CPC ............. H01M 2/1077; H01M 10/613; H01M 10/6567; H01M 10/6568
See application file for complete search history.

(56) References Cited

U.S. PATENT DOCUMENTS

| | | |
|---|---|---|
| 6,275,003 B1 | 8/2001 | Marukawa et al. |
| 7,625,665 B2 | 12/2009 | Jeon et al. |

(Continued)

FOREIGN PATENT DOCUMENTS

| | | |
|---|---|---|
| EP | 2658008 A1 | 10/2013 |
| EP | 3229292 A1 | 10/2017 |

OTHER PUBLICATIONS

Curtis, Adam, "Chevy Volt Battery Pack Tear Down," Hackaday.jo, Downloaded from https://hackaday.io/project/8340-electric-sonett-old-carnew-tech/log/35802-chevy-volt-battery- . . . 1 of 14 Jan. 25, 2018, 11:38 AM. Posted Apr. 13, 2016.

(Continued)

*Primary Examiner* — Stephan J Essex
(74) *Attorney, Agent, or Firm* — David B. Kelley; Carlson, Gaskey & Olds, P.C.

(57) ABSTRACT

A battery module according to an exemplary aspect of the present disclosure includes, among other things, an array of battery cells, a compression structure including a first wall and a second wall, at least one conduit configured to convey fluid adjacent the array, and a tension member connected to the first wall and the second wall. The tension member is adjacent the at least one conduit. This disclosure also relates to an electrified vehicle and a method.

19 Claims, 3 Drawing Sheets

(56) References Cited

U.S. PATENT DOCUMENTS

| | | |
|---|---|---|
| 9,583,747 B2 | 2/2017 | Baek et al. |
| 9,583,748 B2 | 2/2017 | Choi et al. |
| 9,634,295 B2 | 4/2017 | Dube |
| 2011/0177377 A1* | 7/2011 | Dube .................. H01M 2/1061 429/153 |
| 2013/0183571 A1 | 7/2013 | Miyazaki et al. |
| 2016/0036102 A1* | 2/2016 | Suzuki .............. H01M 10/6567 429/120 |
| 2016/0336563 A1 | 11/2016 | Choi et al. |
| 2018/0358591 A1* | 12/2018 | Idikurt ................ H01M 2/1077 |
| 2019/0089026 A1* | 3/2019 | Choi .................. H01M 2/1077 |

OTHER PUBLICATIONS

Arcus, Christopher, "A Tale of 3 Battery Packs," clean Technica, Dowloaded from https://cleantechnica.com/2016/01/06/a-tale-of-3-battery-packs/ on Jan. 25, 2018. Posted Jan. 6, 2016.

\* cited by examiner

BATTERY MODULE WITH TENSION MEMBER RESISTING DEFLECTION

TECHNICAL FIELD

This disclosure relates to a battery module with a tension member configured to resist deflection. This disclosure also relates to an electrified vehicle including the battery module, and a corresponding method.

BACKGROUND

Electric vehicles, such as hybrid electric vehicles (HEVs), use electric machines instead of, or in addition to, an internal combustion engine. Electric vehicles are typically equipped with a battery pack including one or more battery modules. The battery modules includes a plurality of battery cells. One known type of battery module includes compression structures adjacent the base, sides, ends, and top of the module. The compression structures retain the battery cells and provide dimensional stability necessary for the function and durability of the battery architecture.

SUMMARY

A battery module according to an exemplary aspect of the present disclosure includes, among other things, an array of battery cells, a compression structure including a first wall and a second wall, at least one conduit configured to convey fluid adjacent the array, and a tension member connected to the first wall and the second wall. The tension member is adjacent the at least one conduit.

In a further non-limiting embodiment of the foregoing battery module, the at least one conduit includes a first conduit and a second conduit spaced-apart from the first conduit.

In a further non-limiting embodiment of any of the foregoing battery modules, the tension member is between the first and second conduits.

In a further non-limiting embodiment of any of the foregoing battery modules, the first conduit includes an inlet port adjacent the first wall and an outlet port adjacent the second wall, and the second conduit includes an inlet port adjacent the second wall and an outlet port adjacent the first wall.

In a further non-limiting embodiment of any of the foregoing battery modules, each of the inlet and outlet ports are configured for attachment to fluid coupling arrangements.

In a further non-limiting embodiment of any of the foregoing battery modules, the at least one conduit extends along a side of the array, the first wall includes a tab projecting to the side, the second wall includes a tab projecting to the side, and the tension member is affixed to the tabs of the first and second walls.

In a further non-limiting embodiment of any of the foregoing battery modules, the first and second walls are end plates at opposed ends of the array.

In a further non-limiting embodiment of any of the foregoing battery modules, the tension member is a rod.

In a further non-limiting embodiment of any of the foregoing battery modules, the rod is made of a metallic material.

In a further non-limiting embodiment of any of the foregoing battery modules, the rod is connected to the first and second walls such that the first and second walls subject the rod to an axial tensile force.

In a further non-limiting embodiment of any of the foregoing battery modules, the tension member and the at least one conduit extend along axes substantially parallel to one another.

An electrified vehicle according to an exemplary aspect of the present disclosure includes, among other things, a source of cooling fluid, and a battery module including an array of battery cells. The battery module further includes a compression structure having first and second walls, at least one conduit configured to convey the cooling fluid adjacent the battery cells, and a tension member connected to the first wall and the second wall. The tension member is adjacent the at least one conduit.

In a further non-limiting embodiment of the foregoing electrified vehicle, the at least one conduit includes a first conduit and a second conduit spaced-apart from the first conduit, and the tension member is between the first and second conduits.

In a further non-limiting embodiment of any of the foregoing electrified vehicles, the first and second walls are end plates at opposed ends of the array, the first and second conduits extend along a side of the array, the first wall includes a tab projecting to the side, the second wall includes a tab projecting to the side, and the tension member is affixed to the tabs of the first and second walls.

In a further non-limiting embodiment of any of the foregoing electrified vehicles, the tension member is connected to the first and second walls such that the first and second walls subject the tension member to an axial tensile force.

In a further non-limiting embodiment of any of the foregoing electrified vehicles, the tension member is a rod.

In a further non-limiting embodiment of any of the foregoing electrified vehicles, the rod is made of a metallic material.

A method according to an exemplary aspect of the present disclosure includes, among other things, resisting deflection of first and second walls of a battery module with a tension member connected to the first and second walls. The battery module includes at least one conduit configured to direct fluid adjacent an array of battery cells, and the tension member is adjacent the at least one conduit.

In a further non-limiting embodiment of the foregoing method, the method includes establishing a flow of fluid within the at least one conduit.

In a further non-limiting embodiment of any of the foregoing methods, the at least one conduit includes a first conduit and a second conduit spaced-apart from the first conduit, and the tension member is between the first and second conduits.

DETAILED DESCRIPTION

This disclosure relates to a battery module with a tension member configured to resist deflection. This disclosure also relates to an electrified vehicle including the battery module, and a corresponding method. An exemplary battery module includes an array of battery cells, a compression structure including a first wall and a second wall, at least one conduit configured to convey fluid adjacent the array, and a tension member connected to the first wall and the second wall. The tension member is arranged adjacent at least one conduit.

In one example, the at least one conduit is configured to be connected to a fluid coupling. In that example, the tension member resists deflection of the first and second walls adjacent the junction between the at least one conduit and the fluid coupling, which prevents the fluid couplings from detaching from the at least one conduit. Further, the tension member is of a relatively low profile, and in one example is provided by a relatively thin rod. The tension member, thus, can be incorporated within existing vehicle packaging constraints without requiring significant (if any) changes to the design of the remainder of the battery module.

Figure 1:
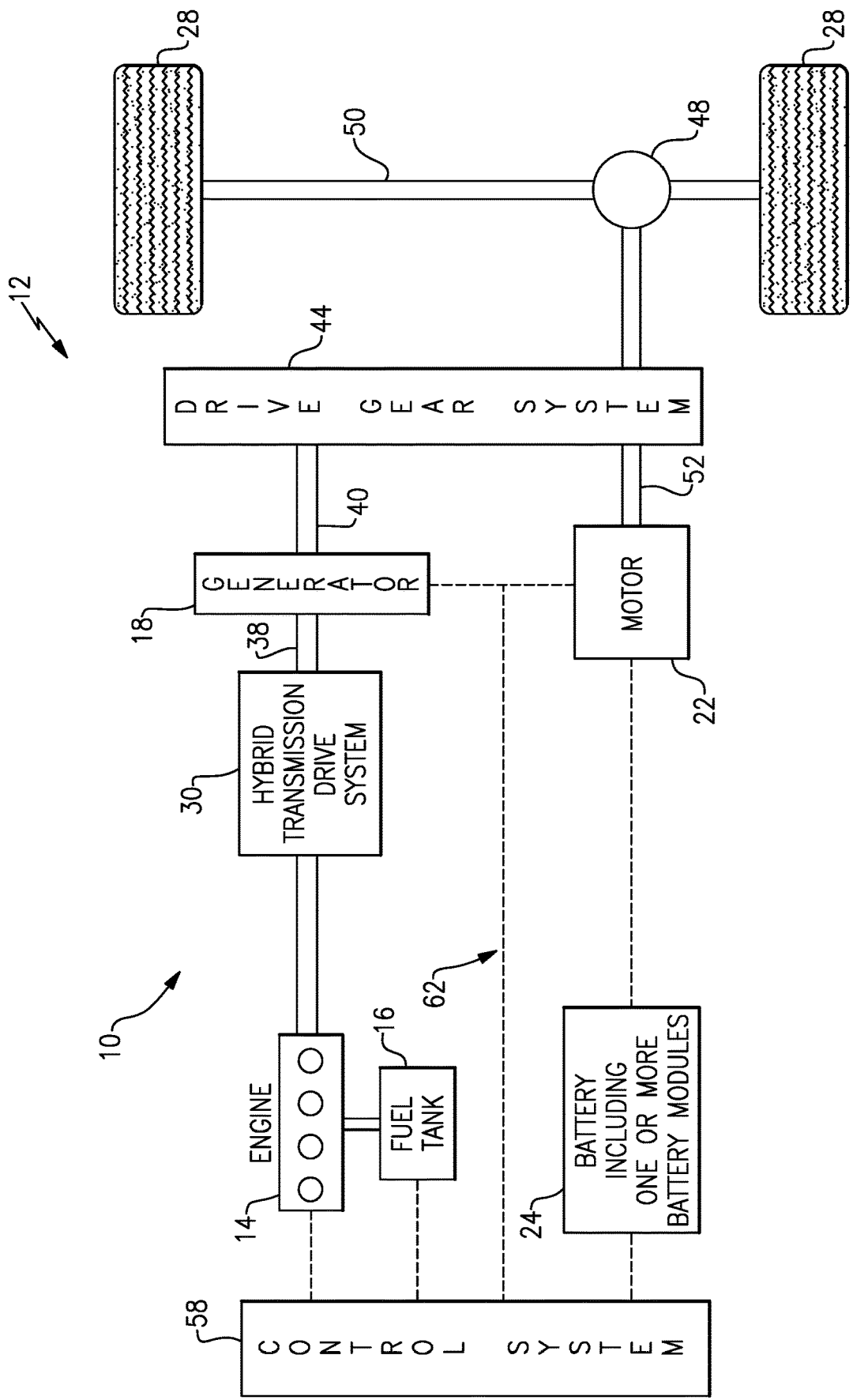
FIG. 1 schematically illustrates a powertrain of an example electrified vehicle.

With reference to the drawings, FIG. 1 schematically illustrates a powertrain 10 of an example vehicle 12, which is an electrified vehicle. Although depicted as a hybrid electric vehicle (HEV), it should be understood that the concepts described herein are not limited to HEVs and could extend to other vehicles, including, but not limited to, plug-in hybrid electric vehicles (PHEVs), battery electric vehicles (BEVs), modular hybrid transmission vehicles, and other vehicles having an electric drive system.

In one embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery 24, which is sometimes referred to as a "battery pack." In this embodiment, the second drive system is considered an electric drive system of the powertrain 10. The first and second drive systems generate torque to drive one or more sets of vehicle drive wheels 28 of the vehicle 12. While a powersplit powertrain is shown in FIG. 1, this disclosure extends to electrified vehicles having different types of powertrains.

The engine 14, which is an internal combustion engine (ICE) in this embodiment, receives fuel, such as gasoline, from a fuel tank 16. Depending on the type of vehicle, fuels other than gasoline may be used. The engine 14 and the generator 18 may be connected through a power transfer unit 30, which in this example is a hybrid transmission gear system, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear, a sun gear, and a carrier assembly.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The power transfer unit 30 may be connected to a shaft 40, which is connected to vehicle drive wheels 28 through a second power transfer unit 44, which in this example is a drive gear system. The second power transfer unit 44 may include a gear set having a plurality of gears. Other power transfer units may also be suitable. The second power transfer unit 44 transfers torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery 24.

The battery 24 is one exemplary type of an electrified vehicle battery assembly and may take the form of a high voltage battery that is capable of outputting electrical power to operate the motor 22 and/or the generator 18. The battery 24 may include one or more battery modules 64 (FIG. 2) connected in parallel or in series, depending on the application. Other types of energy storage devices and/or output devices can also be used to supply power within the vehicle 12.

The powertrain 10 may additionally include a control system 58 (or, "controller") for monitoring and/or controlling various aspects of the vehicle 12. For example, the control system 58 may communicate with the electric drive system, the power transfer units 30, 44, or other components to monitor the vehicle 12, control the vehicle 12, or both.

The control system 58 includes electronics, software, or both, to perform the necessary control functions for operating the vehicle 12. In one non-limiting embodiment, the control system 58 is a combination vehicle system controller and powertrain control module (VSC/PCM). Although it is shown as a single hardware device, the control system 58 may include multiple controllers in the form of multiple hardware devices, or multiple software controllers within one or more hardware devices. A controller area network (CAN) 62 allows the control system 58 to communicate with the various component of the vehicle 12.

Figure 2:
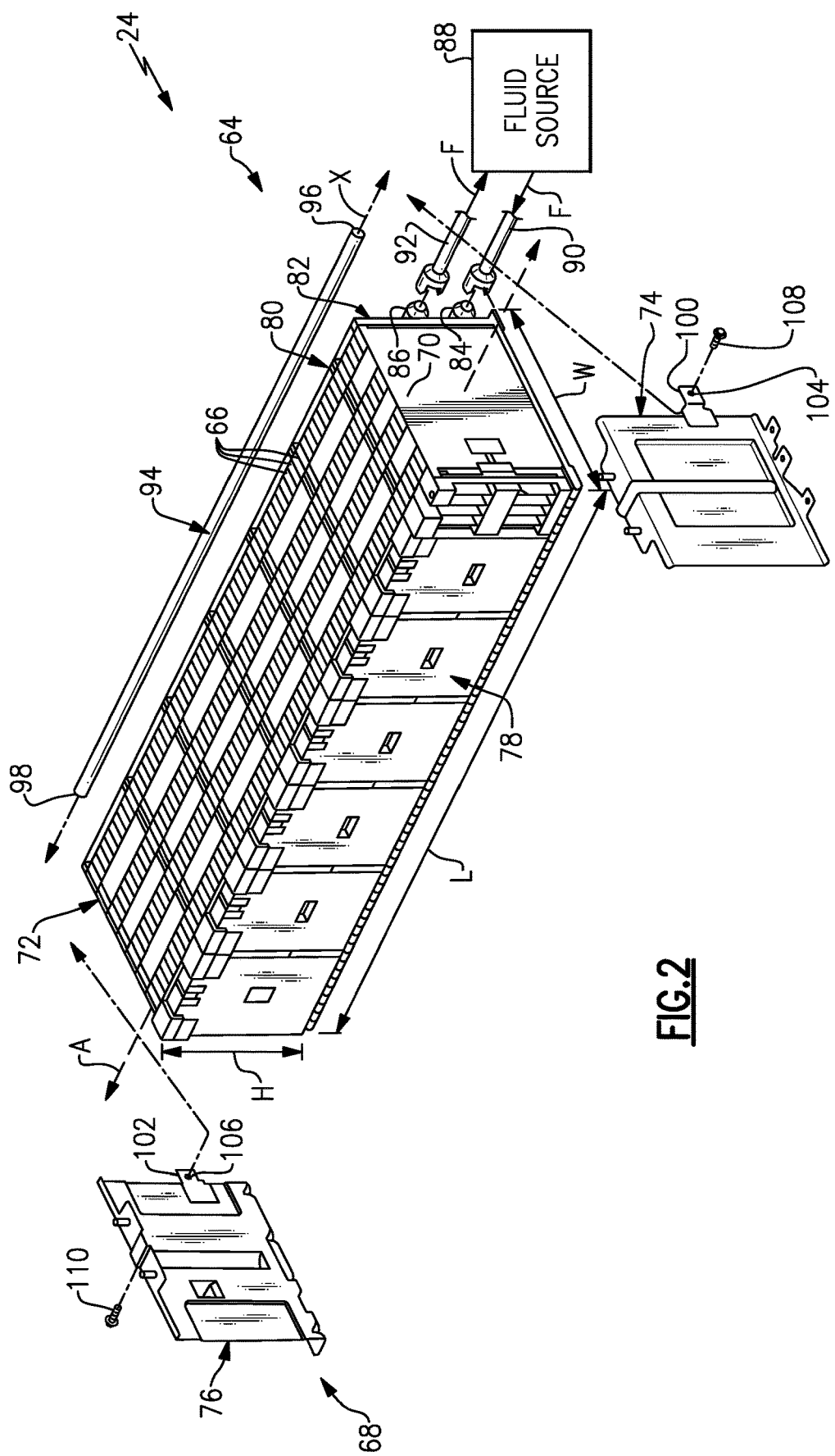
FIG. 2 is an exploded view of an example battery module.

FIG. 2 illustrates an exploded view of an example battery module 64. In this example, the example battery module 64 has a length L, a width W, and a height H. The length L of the battery module is longer than the width W, and in one example the ratio of the length L to the width W is about 5 to 1. Again, as mentioned above, the battery 24 may include one or more of the battery modules 64.

As illustrated in FIG. 2, the battery module 64 includes a plurality battery cells 66 arranged in an array. The array of cells 66 may be referred to simply as an "array." The individual cells 66 of the exemplary embodiment are prismatic battery cells. In other examples, the cells 66 could be pouch cells. The cells 66 may be connected together, either serially or in parallel, by a plurality of bus bars.

The array of cells 66 are held in place within a vehicle by a compression structure 68, which includes a plurality of walls adjacent the array of cells 66. The compression structure 68 holds the cells 66 such that the array extends along an axis A. The axis A is parallel to the length L of the battery module 64. The array of cells 66 extends from a first axial end 70 to a second axial end 72 opposite the first axial end 70. The ends 70, 72 are the endmost portions of the array of cells 66 along the axis A.

When the battery module 64 is assembled, the compression structure 68 applies a compressive force to the cells 66. The compression structure 68, in this example, includes at least a first end plate 74 and a second end plate 76 on opposed sides of the array of cells 66. The first and second end plates 74, 76 are substantially rectangular, and have dimensions substantially corresponding to the width W and height H. In FIG. 2, which again is an exploded view, the first and second end plates 74, 76 are spaced-apart from the array of cells 66. When assembled, however, the first end plate 74 would be arranged adjacent the first axial end 70 and the second end plate 76 would be arranged adjacent the second axial end 72. The first and second end plates 74, 76 are configured to sandwich and compress the battery cells 66 to hold them securely in place.

The compression structure 68 also includes first and second side compression structures 78, 80, which extend along the length L of the battery module 64 between the first and second end plates 74, 76. The first and second end plates 74, 76 span between the side compression structures 78, 80 in the direction of the width W of the battery module 64. While not shown, the compression structure 68 may also include a base plate, adjacent a bottom of the cells 66, and may further include a lid, adjacent a top of the cells 66.

The compression structure 68 is secured together using mechanical fasteners, such as threaded bolts. Although described as mechanical fasteners, other connection techniques could be utilized including, for example, welding or brazing.

In one example of this disclosure, at least one of the side compression structures 78, 80 incorporates a thermal exchange plate, such as a cold plate, which is configured to transfer thermal energy between the cells 66 and a fluid F. In the example where the thermal exchange plate is a cold plate, the thermal exchange plate is configured to absorb heat from the cells 66. In another example, the thermal exchange plate 82 can be utilized to add thermal energy to the battery cells 66.

In the illustrated embodiment, the side compression structure 80 includes a thermal exchange plate 82. The thermal exchange plate 82 includes at least one conduit for conveying the fluid F adjacent the array of cells 66. In this example, the thermal exchange plate 82 includes a first conduit 84 and a second conduit 86. The thermal exchange plate 82 may include additional conduits. The first and second conduits 84, 86 are configured to direct a cooling fluid F along the length L of the array of cells 66. The first and second conduits 84, 86 are substantially straight, hollow tubes in this example, extending along longitudinal axes substantially parallel to the axis A. Further, each of the first and second conduits 84, 86 are spaced-apart from one another in the direction of the height H.

It should be understood that the cooling fluid F may be any known cooling fluid including a refrigerant, water, or air, to name a few examples. The cooling fluid F is provided from a source 88, in this example. The first conduit 84 is fluidly coupled to the source 88 by way of a first fluid coupling arrangement 90, which includes at least one conduit and fitting. In this sense, the end of the first conduit 84 shown in FIG. 2 provides an inlet port for the first conduit 84. Further, the second conduit 86 is fluidly coupled to the source by way of a second fluid coupling arrangement 92, which also includes at least one conduit and fitting. The end of the second conduit 86 shown in FIG. 2 provides an outlet port for the second conduit 86.

In one example of use, a flow of fluid F is established within the first conduit 84, and in particular is directed from the source 88 to the first conduit 84 via the first fluid coupling arrangement 90. The fluid F travels along the length L of the array of cells 66, absorbing heat from the cells 66 along the way. The fluid F is eventually directed back through the second conduit 86, and ultimately back to the source 88 via the second fluid coupling arrangement 92. Other flow schemes come within the scope of this disclosure.

The first and second end plates 74, 76 may apply a compressive force to the ends of the side compression structures 78, 80. In particular, the first and second end plates 74, 76 may apply a compressive force to the ends of the thermal exchange plate 82. Charging and discharging of the battery cells 66 can generate thermal energy, which may cause the cells 66 to swell. The thermal exchange plate 82 can be utilized to remove thermal energy from the battery cells 66, which resists such swelling.

Even with the thermal exchange plate 82 operating efficiently, the cells 66 may still swell. As the cells 66 swell, the cells 66 may overcome the compressive forces of the first and second end plates 74, 76, and deflect the first and second end plates 74, 76 away from one another. In this disclosure, in order to resist such deflection, a tension member 94 is connected to the first and second end plates 74, 76 adjacent the first and second conduits 84, 86. The term "member," as in "tension member," is not used herein as a nonce term to refer to all types of generic "members," but rather specifically refers to a "tension member," which is a known term in the mechanical arts and refers to a specific type of structure. The term tension member refers to a structural element that is subjected to axial tensile forces in normal operating conditions.

The tension member 94, in one example, is a rod. The rod may be made of a metallic material, such as steel. In a particular example, the rod is made of a low gauge steel material. The rod is substantially straight, in this example. The rod has a relatively small diameter, and thus provides a substantially low profile structure in this example.

Under normal operating conditions, and even more so when the cells 66 swell, the tension member 94 is subjected to axial tensile forces by the first and second end plates 74, 76. Specifically, the first and second end plates 74, 76 essentially pull respective first and second ends 96, 98 of the tension member 94 in opposite directions along the longitudinal axis X of the tension member 94.

In this example, the tension member 94 is connected directly to the first and second end plates 74, 76. Further, the tension member 94 extends along a side of the battery module 64 between the first and second conduits 84, 86. Specifically, the tension member 94 is between the first and second conduits 84, 86, relative to the height H of the battery module 64. The tension member 94 extends such that the longitudinal axis X is substantially parallel to the axis A and the longitudinal axes of the first and second conduits 84, 86.

In order to connect to the tension member 94, the first and second end plates 74, 76 each include a tab 100, 102. The tabs 100, 102 project from a respective one of the first and second end plates 74, 76 toward the side of the battery module 64 having the first and second conduits 84, 86 and the tension member 94. The tab 100 is arranged such that, when the battery module is assembled, the tab 100 will directly contact the end 96 of the tension member 94. Likewise, the tab 102 is arranged such that it will directly contact the end 98, as shown in FIG. 3.

The tension member 94 may be affixed to the tabs 100, 102 by a fastener, such as a threaded bolt. The ends 96, 98 of the tension member 94 may include bores having threads corresponding to the threaded bolts. In the illustrated example, the tabs 100, 102 include apertures 104, 106 that allow the threaded shanks of fasteners 108, 110 to enter into the bores of the tension member 94. It should be understood that this disclosure is not limited to threaded fasteners, and extends to other techniques for affixing the tension member 94 to the tabs 100, 102.

Figure 3:
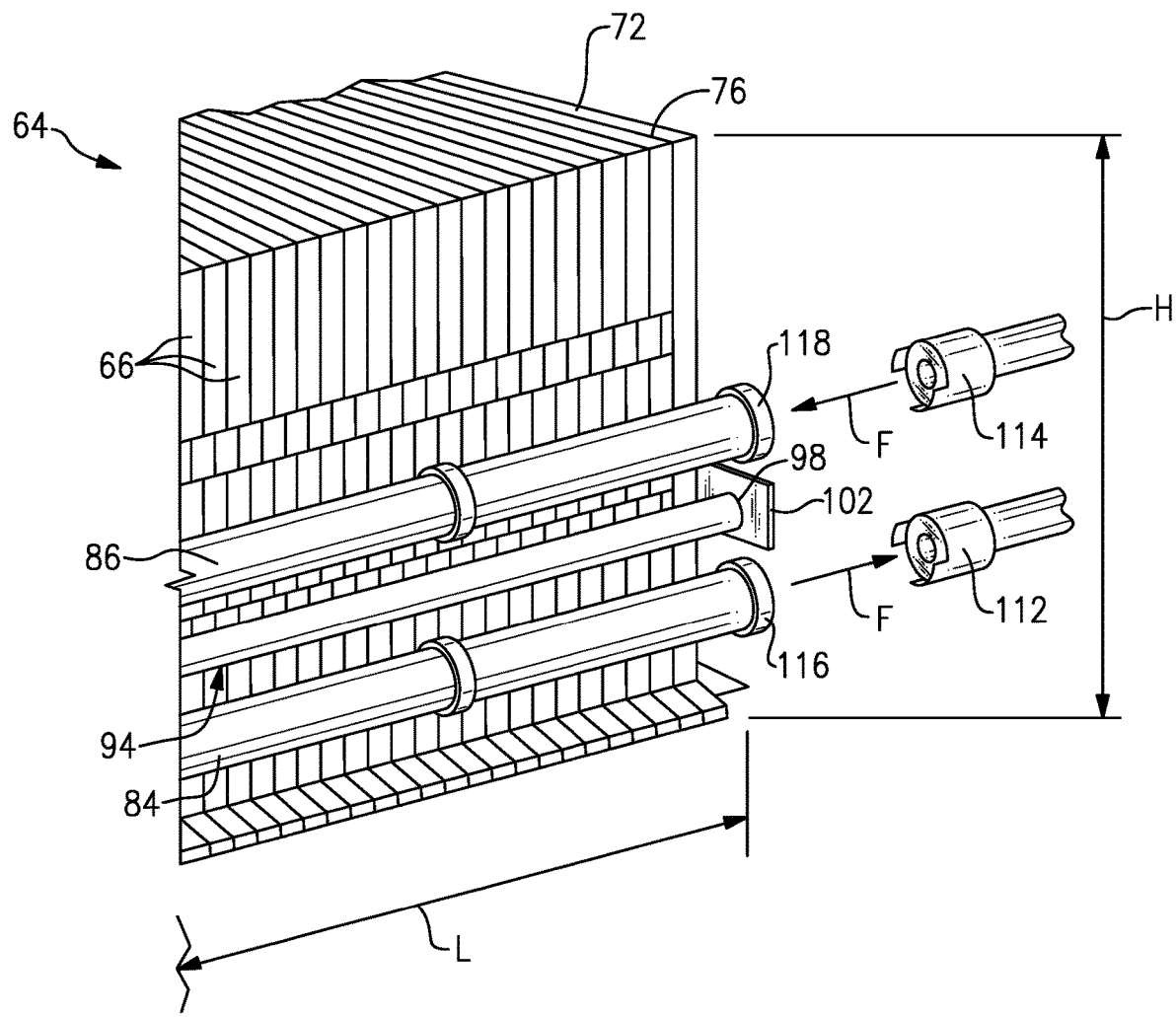
FIG. 3 is a close-up view of an end of the battery module.

FIG. 3 is a close-up view of the battery module 64, with the second end plate 76 arranged adjacent the second axial end 72 of the array of cells 66. In FIG. 3, the tension member 94 is affixed to the tab 102 such that the end 98 directly contacts the tab 102. While not shown in FIG. 3, the fastener 110 is threaded into and engaged with a bore adjacent the end 98 of the tension member 94.

FIG. 3 also shows the first and second conduits 84, 86, which are arranged adjacent the tension member 94. The first and second conduits 84, 86 are configured for attachment to fluid coupling arrangements, which include fittings 112, 114 in this example. Specifically, respective ends 116, 118 of the first and second conduits 84, 86 are configured to connect to the fittings 112, 114. The end 116 is an outlet port of the first conduit 84, in this example, and the end 118 of the second conduit 86 is an inlet port of the second conduit 86. The fittings 112, 114 are shown detached from the first and second conduits 84, 86 for ease of reference. The fittings 112, 114 are configured to direct fluid F to and from the first and second conduits 84, 86, to another side of the battery module 64 or to other battery modules 64 via one or more conduits and fittings, as the case may be.

While the battery module 64 consists of only one tension member 94 in this example, the battery module 64 could include additional tension members 94. Tension members may be used where a load is anticipated and/or where preventing deflection of spaced-apart components is particularly beneficial, as examples.

It should be understood that terms such as "top," "bottom," "between," and "side," are directional terms made with reference to the normal operational attitude of the components being described. These directional terms are used for purposes of explanation only, and should not otherwise be considered to be limiting. Further, terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A battery module, comprising:
an array of battery cells;
a compression structure including a first wall and a second wall;
at least one conduit configured to convey fluid adjacent the array, wherein the at least one conduit includes an inlet port adjacent one of the first wall and the second wall and an outlet port adjacent the other of the first wall and the second wall, wherein the inlet and outlet ports are configured for attachment to fluid coupling arrangements; and
a tension member connected to the first wall and the second wall, and wherein the tension member is adjacent the at least one conduit,
wherein the tension member is the sole tension member of the battery module.

2. The battery module as recited in claim 1, wherein the at least one conduit includes a first conduit and a second conduit spaced-apart from the first conduit.

3. The battery module as recited in claim 2, wherein the tension member is between the first and second conduits relative to a height of the battery module.

4. The battery module as recited in claim 2, wherein:
the first conduit includes an inlet port adjacent the first wall and an outlet port adjacent the second wall, and
the second conduit includes an inlet port adjacent the second wall and an outlet port adjacent the first wall.

5. The battery module as recited in claim 4, wherein each of the inlet and outlet ports are configured for attachment to fluid coupling arrangements.

6. The battery module as recited in claim 1, wherein:
the at least one conduit extends along a side of the array,
the first wall includes a tab projecting to the side,
the second wall includes a tab projecting to the side, and
the tension member is affixed to the tabs of the first and second walls.

7. The battery module as recited in claim 6, wherein the first and second walls are end plates at opposed ends of the array.

8. The battery module as recited in claim 1, wherein the tension member is a metallic rod.

9. The battery module as recited in claim 8, wherein the rod is connected to the first and second walls such that the first and second walls subject the rod to an axial tensile force.

10. The battery module as recited in claim 1, wherein the tension member and the at least one conduit extend along axes substantially parallel to one another.

11. An electrified vehicle, comprising:
a source of cooling fluid; and
a battery module including an array of battery cells, a compression structure having first and second walls, at least one conduit configured to convey the cooling fluid adjacent the battery cells, and a tension member connected to the first wall and the second wall, wherein the at least one conduit includes an inlet port adjacent one of the first wall and the second wall and an outlet port adjacent the other of the first wall and the second wall, wherein the inlet and outlet ports are configured for attachment to fluid coupling arrangements, wherein the tension member is adjacent the at least one conduit, and wherein the tension member is the sole tension member of the battery module.

12. The electrified vehicle as recited in claim 11, wherein:
the at least one conduit includes a first conduit and a second conduit spaced-apart from the first conduit, and
the tension member is between the first and second conduits relative to a height of the battery module.

13. The electrified vehicle as recited in claim 12, wherein:
the first and second walls are end plates at opposed ends of the array,
the first and second conduits extend along a side of the array,
the first wall includes a tab projecting to the side,
the second wall includes a tab projecting to the side, and the tension member is affixed to the tabs of the first and second walls.

14. The electrified vehicle as recited in claim 13, wherein the tension member is connected to the first and second walls such that the first and second walls subject the tension member to an axial tensile force.

15. The electrified vehicle as recited in claim 11, wherein the tension member is a metallic rod.

16. A method, comprising:
resisting deflection of first and second walls of a battery module with a tension member connected to the first and second walls, wherein the battery module includes at least one conduit configured to direct fluid adjacent an array of battery cells, wherein the at least one conduit includes an inlet port adjacent one of the first wall and the second wall and an outlet port adjacent the other of the first wall and the second wall, wherein the inlet and outlet ports are configured for attachment to fluid coupling arrangements, wherein the tension member is adjacent the at least one conduit, and wherein the tension member is the sole tension member of the battery module.

17. The method as recited in claim 16, further comprising: establishing a flow of fluid within the at least one conduit.

18. The battery module as recited in claim 1, wherein the tension member and the at least one conduit are arranged on a common side of the battery module.

19. The battery module as recited in claim 6, wherein the tabs of the first and second walls are the only tabs of the battery module.

* * * * *